United States Patent [19]

Baker et al.

[11] Patent Number: 5,200,477
[45] Date of Patent: * Apr. 6, 1993

[54] PROCESS FOR PRODUCING STICKY POLYMERS

[75] Inventors: Edgar C. Baker, Bridgewater; George N. Foster, Bloomsbury; Aaron S. Rhee, Belle Mead, all of N.J.

[73] Assignee: Union Carbide Chemicals & Plastics Technology Corporation, Danbury, Conn.

[*] Notice: The portion of the term of this patent subsequent to Nov. 10, 2009 has been disclaimed.

[21] Appl. No.: 659,565

[22] Filed: Feb. 22, 1991

[51] Int. Cl.⁵ .................................................. C08F 2/34
[52] U.S. Cl. ........................................ 526/74; 526/88; 526/194; 526/348; 526/901
[58] Field of Search ............... 526/74, 88, 194, 348, 526/901

[56] References Cited

U.S. PATENT DOCUMENTS 4,994,534  2/1991  Rhee et al. ..................... 526/168

Primary Examiner—Joseph L. Schofer
Assistant Examiner—Tom Weber
Attorney, Agent, or Firm—C. J. Vicari

[57] ABSTRACT

A process for preventing agglomeration of sticky polymers in a polymerization system which comprises adding to said polymerization system about 0.3 to about 80 weight percent based on the weight of the final product of an inert particulate material having an organo-modified polydimethylsiloxane (OM-PDMS) surface coating thereon.

23 Claims, 1 Drawing Sheet

PROCESS FOR PRODUCING STICKY POLYMERS

BACKGROUND OF THE INVENTION

1. Field of the Invention

The present invention relates to sticky polymers and more particularly to a process for preventing agglomeration of sticky polymers in polymerization systems.

2. Description of the Prior Art

The introduction of high activity Ziegler-Natta catalyst systems has lead to the development of new polymerization processes based on gas phase reactors such as disclosed in U.S. Pat. No. 4,482,687 issued Nov. 13, 1984. These processes offer many advantages over bulk monomer slurry processes or solvent processes. They are more economical and inherently safer in that they eliminate the need to handle and recover large quantities of solvent while advantageously providing low pressure process operation.

The versatility of the gas phase fluid bed reactor has contributed to its rapid acceptance. Alpha-olefins polymers produced in this type of reactor cover a wide range of density, molecular weight distribution and melt indexes. In fact new and better products have been synthesized in gas phase reactors because of the flexibility and adaptability of the gas phase reactor to a large spectrum of operating conditions.

The term "sticky polymer" is defined as a polymer, which, although particulate at temperatures below the sticking or softening temperature, agglomerates at temperatures above the sticking or softening temperature. The term "sticking temperature", which, in the context of this specification, concerns the sticking temperature of particles of polymer in a fluidized or stirred bed, is defined as the temperature at which fluidization or stirring ceases due to excessive agglomeration of particles in the bed. The agglomeration may be spontaneous or occur on short periods of settling.

By polymerization systems is meant those type reactors and systems which are capable of producing and handling "sticky polymers". These can include fluidized bed reactors, stirred reactors, slurry reactors and gas-solid, gas-liquid-solid and liquid-solid phase polymerization reactors and their post reactor receiving and handling units.

A polymer may be inherently sticky due to its chemical or mechanical properties or pass through a sticky phase during the production cycle. Sticky polymers are also referred to as non-free flowing polymers because of their tendency to compact into agglomerates of much larger size than the original particles. Polymers of this type show acceptable fluidity in a gas phase fluidized bed reactor; however, once motion ceases, the additional mechanical force provided by the fluidizing gas passing through the distributor plate is insufficient to break up the agglomerates which form and the bed will not refluidize. In addition in stirred bed reactors particle agglomeration can seriously interfere with the mechanical mixing action in the reactor. These polymers are classified as those, which have a minimum bin opening for free flow at zero storage time of two feet and a minimum bin opening for free flow at storage times of greater than five minutes of 4 to 8 feet or more.

Sticky polymers can also be defined by their bulk flow properties. This is called the Flow Function. On a scale of zero to infinity, the Flow Function of free flowing materials such as dry sand is infinite. The Flow Function of free flowing polymers is about 4 to 10, while the Flow Function of non-free flowing or sticky polymers is about 1 to 3.

Although many variables influence the degree of stickiness of the polymer resin, it is predominantly governed by the temperature and the crystallinity of the resin. Higher temperatures of the resin increase its stickiness while less crystalline products such as very low density polyethylene (VLDPE), ethylene/propylene monomer (EPM), ethylene/propylene/diene monomer (EPDM) and essentially amorphous or elastomeric polypropylene usually display a larger tendency to agglomerate to form larger particles.

Low pressure polymerizations in a gas phase reaction of olefin polymers using transition metal catalysis are generally performed at temperatures below 120° C. Where the higher levels of comonomers are used and crystallinity levels are reduced below 30%, the melting or softening temperature of these olefin polymers can be close to the polymerization temperatures which are used. Under such conditions in either a fluidized or stirred gas-solid phase reactor, stickiness of the olefin polymer particles or granules becomes a problem. Ethylene copolymers using propylene, butene-1, and higher alpha comonomers are prone to stickiness problems when their crystallinity is below 30% or densities less than about 910 kg/m$^3$. The stickiness problem becomes even more critical with copolymers of ethylene and propylene, and their diene terpolymers (EPM and EPDM, or EPRs) having a crystalline content less than 10%. The presence of diene further complicates the stabilization of the polymer composition.

The stickiness problem in a fluidized bed or a gas-phase reactor can be reduced by the introduction of selected, fine-particle size, inorganic materials which act as a fluidization or flow aid. Certain grades of carbon black, clay and silica have been shown to be useful for this purpose (see copending application Ser. No. 07/413,704 filed Sep. 28, 1989 and which is assigned to a common assignee, now U.S. Pat. No. 4,994,534. Further the treatment of alpha-olefin polymers with low levels of polydimethylsiloxane (PDMS) has been proposed as a means of diminishing adhesion of the polymer particles to themselves and to the reactor walls (see for example, European Patent application no. 0 254 234 filed Jul. 17, 1987 and assigned to Mitsubishi Chemical Industries Limited and U.S. Pat. No. 4,675,368 issued Jun. 23, 1987).

However, the surface treatment of granular EPR with PDMS in a concentration range of 0.01 to 5.0% by weight has not been found to be effective in preventing sticking under fluidized bed conditions. Furthermore, there are processing difficulties (e.g., uniform coating or dispersion without liquid binding) in directly treating the EPRs either in-situ or in post reaction in a continuous reaction with such PDMS because of their relative high viscosities.

The present invention relates to improvements not only in reducing the stickiness of polymer particles in polymerization systems but also in providing an effective means for post reactor catalyst deactivation and stabilization without melt compounding. These improvements are obtained when selected, fine-particle size, inorganic materials, such as carbon black, clay, or silica, are surface treated with an organo modified (OM) polydimethylsiloxane (PDMS) and used in polymerization systems. Because functional groups are present in the OM-PDMS, improved stabilization and catalysts deactivation properties are imparted to the final products.

SUMMARY OF THE INVENTION

Broadly contemplated the present invention provides a process for preventing agglomeration of sticky polymers in a polymerization system which comprises adding to said polymerization system about 0.3 to about 80 weight percent based on the weight of the final product of an inert particulate material having a surface coating thereon of an OM-PDMS of the formula:

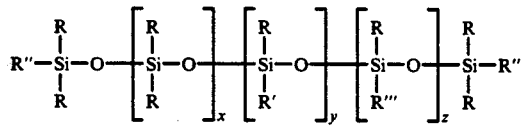

wherein:
R, may be the same or different, and represents phenyl or an alkyl group having from 1 to 4 carbon atoms;
R', represents hydrogen, or a straight or branched or cyclic alkyl chain having 5 to 50 carbon atoms;
R", may be the same or different and represents R or R'
R''' is alkylene, cycloaklyl, or alkoxy which can be substituted with hydroxy, amino, alkyl substituted amino, hydroxyl amino, phenol, alkyl Substituted phenol, alkyl substituted piperidinoxy and epoxy;
X = is an integer of 0 to <2000
Y = is an integer of 0 to <2000,
Z is an integer of 1 to 2000, with the proviso that the sum of (x+y+z) is greater than or equal to 4 and less than or equal to 2000, with the further proviso that the repeat units if they are present can be in any sequence, either random or non-random.

The organo-modified polydimethylsiloxane can be present on the inert particulate material in an amount of about 0.02% to about 20% based on the weight of said inert particulate material.

In a more limited aspect the present invention provides a method for preventing agglomeration of sticky polymers produced in a fluidized bed reactor in the presence of a catalyst by conducting the polymerization reaction in the presence of about 0.3 to about 80 weight percent, preferably about 5% to about 75% based on the weight of the final product of the inert particulate material having a surface coating thereon of the organo modified polydimethylsiloxane shown in the above formula.

The organo-modified polydimethylsiloxane can be present on the inert particulate material in an amount of about 0.02% to about 20% based on the weight of the inert particulate material.

In the above formula, R is preferably methyl, R' is preferably a straight or branched alkyl chain having 8 to 24 carbon atoms, R" is preferably methyl or a straight or branched alkyl chain having 8 to 24 carbon atoms.

When using the OM-PDMS materials of this invention, several improvements have been noted and include (1) increased temperatures at which the resin bed can be fluidized without sticking problems for a given percentage of fluidization aid; (2) decreased concentration of fluidization aid needed at a given reaction temperature; and/or (3) a viable means for catalyst deactivation and stabilization by activating the functionalities in a post reactor unit operation by contact with moist nitrogen, for example. Another potential advantage of this invention is improved catalyst activity in the polymerization reaction.

DETAILED DESCRIPTION OF THE INVENTION

Figure 1:
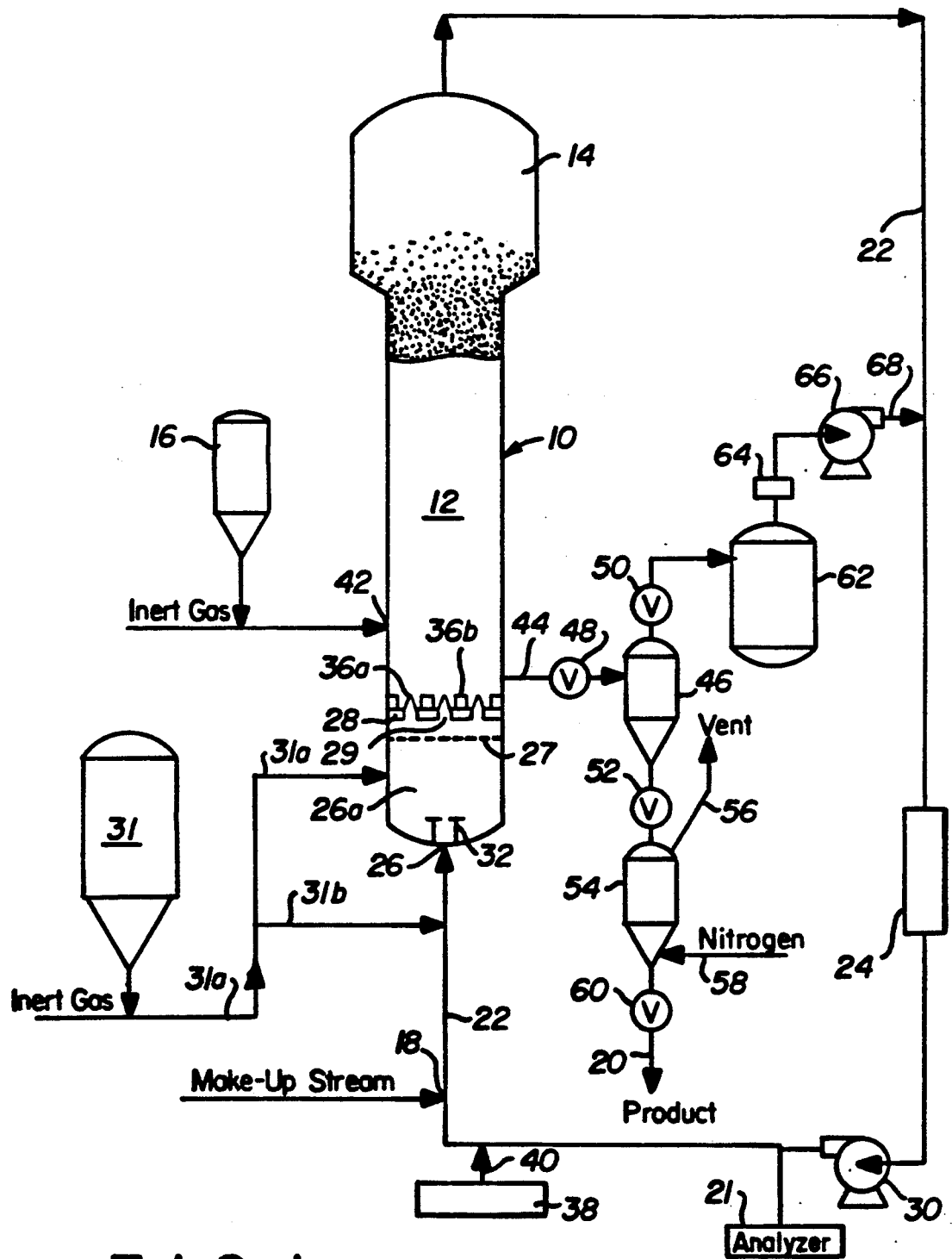
FIG. 1 illustrates a typical gas fluidized bed reaction scheme for producing sticky polymers.

Although the process can be practiced in any polymerization system which experiences agglomeration of sticky polymers, the process is preferably applicable for preventing agglomeration of sticky polymers in a fluidized bed reactor.

The fluidized bed reactor can be the one described in U.S. Pat. No. 4,558,790. Other types of conventional reactors for the gas phase production of, for example, polyethylene or ethylene copolymers and terpolymers can also be employed. At the start up, the bed is usually made up of polyethylene granular resin. During the course of the polymerization, the bed comprises formed polymer particles, growing polymer particles, and catalyst particles fluidized by polymerizable and modifying gaseous components introduced at a flow rate or velocity sufficient to cause the particles to separate and act as a fluid. The fluidizing gas is made up of the initial feed, make-up feed, and cycle (recycle) gas, i.e., monomer and, if desired, modifiers and/or an inert carrier gas. The fluidizing gas can also be a halogen or other gas. A typical cycle gas is comprised of ethylene, nitrogen, hydrogen, propylene, butene, or hexene monomers, diene monomers, either alone or in combination.

Examples of sticky polymers, which can be produced by subject process include ethylene/propylene rubbers and ethylene/propylene/diene termonomer rubbers, polybutadiene rubbers, high ethylene content propylene/ethylene block copolymers, poly (1-butene) or essentially amorphous or elastomeric polypropylene (when produced under certain reaction conditions), very low density (low modulus) polyethylenes, ethylene/butene or hexene containing polymers, ethylene/propylene/ethylidenenorbornene, ethylene/propylene/hexadiene polymers of low density, ethylene/butene, ethylene/hexene, ethylene/propylene/butene, ethylene/propylene/hexene and ethylene/butene/hexene polymers.

Subject process can be carried out in a batch or continuous mode, the latter being preferred.

Characteristic of two types of resins which can be produced in subject process are as follows:

One type of resin is an ethylene/propylene rubber containing 25 to 65 percent, by weight, propylene. This material is sticky to the touch at reactor temperatures of 20° C. to 40° C. and has a severe tendency to agglomerate when allowed to settle for periods of more than two to five minutes. Another sticky resin is an ethylene/butene copolymer produced at reactor temperatures of 50° C. to 80° C. at density levels of 880 to 905 kilograms per cubic meter and melt index levels of 1 to 20 and chlorinated or chlorosulfonated after being produced in the fluidized bed reactor.

The inert particulate material employed according to the present invention are materials which are substantially chemically inert to the reaction. Examples of inert particulate materials include carbon black, silica, talc, clays and other like materials. Carbon blacks are the preferred materials. The carbon black materials employed have a primary particle size of about 1 to 100 nano meters and an average size of aggregate (primary structure) of about 0.01 to about 10 microns. The specific surface area of the carbon black is about 30 to 1,500 m$^2$/gm and display a dibutylphthalate (DBP) absorption of about 10 to about 700 cc/100 grams.

The silicas which can be employed are amorphous silicas having a primary particle size of about 5 to 50 nanometers and an average size of aggregate of about 0.1 to about 10 microns. The average size of agglomerates of silica is about 2 to about 120 microns. The silicas employed have a specific surface area of about 50 to 500 m$^2$/gm and a dibutylphthalate (DBP) absorption of about 100 to 400 cc/100 grams.

Non-aggregated silicas, clays, talc, and other powdery materials can also be employed according to the present invention and they can have an average particle size of about 0.01 to about 10 microns and a specific surface area of about 2 to 350 m$^2$/gm. They exhibit oil absorption of about 20 to about 300 gms per 100 gms.

It is preferred that both amorphous and non-aggregated silicas as well as talc should be substantially calcined to drive out chemisorbed water and/or hydroxyl groups in them. This calcination should be done before these materials are surface treated with an OM-PDMS. A proper calcination temperature would be in the range of 500° C. to 900° C., preferably 700° to 800° C.

The coating which is applied to the inert particulate material is formulated from an organo-modified polydimethylsiloxane of the formula:

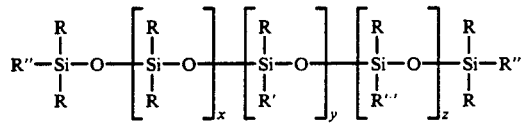

wherein:
R, may be the same or different represents phenyl or an alkyl group having from 1 to 4 carbon atoms;
R', represents hydrogen, or a straight or branched or cyclic alkyl chain having 5 to 50 carbon atoms;
R", may be the same or different represents R or R
R''' is alkylene, cycloalkyl or alkoxy which can be substituted with hydroxy, amino, alkyl substituted amino, hydroxyl amino, phenol, alkyl substituted phenyl, and epoxy.
X = is an integer of 0 to <2000
Y = is an integer of 0 to <2000,
Z = is an integer of 1 to 2000, with the proviso that the sum of (x+y+z) is greater than or equal to 4 and less than or equal to 2000, with the further proviso that the repeat units if they are present can be in any sequence, either random or non-random.

Examples of organo modified polydimethylsiloxanes which can be employed in the present invention include 3-hydroxypropyl modified polydimethylsiloxane, propylglycidyl ether modified PDMS; propoxypropanediol modified PDMS, propylamine modified PDMS, di-2-hydroxy ethyl propyl amino PDMS ethyl cyclohexane monoxide modified PDMS, propyl-3-(3,5-di-tert. butyl-4-hydroxy phenyl) propionate, modified PDMS propyl-3-(3,5-di-tert, butyl-4-hydroxy phenyl) modified PDMS propyl-3-(2,2,6,6-tetramethyl-4-piperidinoxy) modified PDMS octyl-8-(2,2,6,6-tetramethyl-4-piperidinoxy) modified PDMS, (2,2,6,6-tetra methyl-4 piperidinoxy) modified PDMS, propyl-3-(1,2,2,6,6-pentamethyl-4-piperidinoxy) modified PDMS.

In general the coating can be applied to the solid particulate material by dissolving the OM-PDMS in a suitable solvent such as methylene chloride and thereafter adding the inert material to the solution to form a slurry. The solvent can then be evaporated to leave a coating of the PDMS over the inert material. Alternatively, the OM-PDMS solution can be sprayed on to the inert particulate material. In a further procedure an aqueous dispersion of the OM-PDMS can be formed and applied to the inert particulate material either by the spraying or slurry procedure described above. The water can be removed by conventional procedures. Other conventional means of surface treatment can be employed as known in the art.

The coating is present on the surface of inert particulate material in an amount of 0.02%, to about 20% preferably about 1% to about 10% based on the weight of the inert particulate material.

The amount of inert particulate material utilized generally depends on the type of material utilized and the type of polymer produced. When utilizing carbon black or amorphous silicas as the inert material, they can be employed in amounts of about 0.3 to about 70% by weight preferably about 5% to about 65% based on the weight of the final product produced (weight of polymer plus weight of inert particulate and weight of OM-PDMS and other additives or residues). When non-aggregated silicas, clays, talc, or other powdery materials or mixture thereof are employed as the inert particulate material, the amount can range from about 0.3 to about 80% based on the weight of the final product preferably about 12% to 75% by weight.

The coated inert particulate materials can be directly introduced into the reactor, preferably at the bottom of the reactor or to the recycle line directed into the bottom of the reactor. It is preferred to treat the coated inert particulate material prior to entry into the reactor to remove traces of moisture and oxygen. This can be accomplished by purging the material with nitrogen gas, and heating by conventional procedures.

A fluidized bed reaction system which is particularly suited to production of polyolefin resin by the practice of the process of the present invention is illustrated in the drawing. With reference thereto and particularly to FIG. 1, the reactor 10 comprises a reaction zone 12 and a velocity reduction zone 14.

In general, the height to diameter ratio of the reaction zone can vary in the range of about 2.7:1 to about 5:1. The range, of course, can vary to larger or smaller ratios and depends upon the desired production capacity. The cross-sectional area of the velocity reduction zone 14 is typically within the range of about 2.5 to about 2.9 multiplied by the cross-sectional area of the reaction zone 12.

The reaction zone 12 includes a bed of growing polymer particles, formed polymer particles and a minor amount of catalyst all fluidized by the continuous flow of polymerizable and modifying gaseous components in the form of make-up feed and recycle fluid through the reaction zone. To maintain a viable fluidized bed, the superficial gas velocity (SGV) through the bed must exceed the minimum flow required for fluidization which is typically from about 0.2 to about 0.8 ft/sec depending on the average particle size of the product. Preferably the SGV is at least 1.0 ft/sec above the minimum flow for fluidization of from about 1.2 to about 6.0 ft/sec. Ordinarily, the SGV will not exceed 6.0 ft/sec and it is usually no more than 5.5 ft/sec.

Particles in the bed help to prevent the formation of localized "hot spots" and to entrap and distribute the particulate catalyst through the reaction zone. Accordingly, on start up, the reactor is charged with a base of particulate polymer particles before gas flow is initiated. Such particles may be the same as the polymer to be formed or different. When different, they are withdrawn with the desired newly formed polymer particles as the first product. Eventually, a fluidized bed consisting of desired polymer particles supplants the start-up bed.

The catalysts used are often sensitive to oxygen, thus the catalyst used to produce polymer in the fluidized bed is preferably stored in a reservoir 16 under a blanket of a gas which is inert to the stored material, such as nitrogen or argon.

Fluidization is achieved by a high rate of fluid recycle to and through the bed, typically on the order of about 50 to about 150 times the rate of feed of make-up fluid. This high rate of recycle provides the requisite superficial gas velocity necessary to maintain the fluidized bed. The fluidized bed has the general appearance of a dense mass of individually moving particles as created by the percolation of gas through the bed. The pressure drop through the bed is equal to or slightly greater than the weight of the bed divided by the cross-sectional area. It is thus dependent on the geometry of the reactor.

Make-up fluid can be fed at point 18 via recycle line 22 although it is also possible to introduce make up fluid between heat exchanger 24 and velocity reduction zone 14 in recycle line 22. The composition of the recycle stream is measured by a gas analyzer 21 and the composition and amount of the make-up stream is then adjusted accordingly to maintain an essentially steady state gaseous composition within the reaction zone.

The gas analyzer is a conventional gas analyzer which operates in conventional manner to indicate recycle stream composition and which is adapted to regulate the feed and is commercially available from a wide variety of sources. The gas analyzer 21 can be positioned to receive gas from a point between the velocity reduction zone 14 and the dispenser 38, preferably after the compressor 30.

To ensure complete fluidization, the recycle stream and, where desired, part of the make-up stream are returned through recycle line 22 to the reactor at point 26 below the bed preferably there is a gas distributor plate 28 above the point of return to aid in fluidizing the bed uniformly and to support the solid particles prior to start-up or when the system is shut down. The stream passing upwardly through the bed absorbs the heat of reaction generated by the polymerization reaction.

The portion of the gaseous stream flowing through the fluidized bed which did not react in the bed becomes the recycle stream which leaves the reaction zone 12 and passes into a velocity reduction zone 14 above the bed where a major portion of the entrained particles drop back into the bed thereby reducing solid particle carryover.

The recycle stream exiting the compressor is then returned to the reactor at its base 26 and thence to the fluidized bed through a gas distributor plate 28. A fluid flow deflector 32 is preferably installed at the inlet to the reactor to prevent contained polymer particles from settling out and agglomerating into a solid mass and to maintain entrained or to re-entrain any liquid or solid particles which may settle out or become disentrained.

The fluid flow deflector, comprises an annular disc supported at a stand off distance above the reactor inlet 26 by the spacers 32a and divides the entering recycle stream into a central upward flow stream and an upward peripheral annular flow stream along the lower side walls of the reactor. The flow streams mix and then pass through protective screen 27, the holes or ports 29 of the distributor plate 28 and the angle caps 36a and 36b, secured to the upper surface of the distributor plate, and eventually into the fluidized bed.

The central upward flow stream in the mixing chamber 26a assists in the entrainment of liquid droplets in the bottom head or mixing chamber and in carrying the entrained liquid to the fluidized bed section during a condensing mode of reactor operation. The peripheral flow assists in minimizing build-up of solid particles in the bottom head because it sweeps the inner surfaces of the reactor walls. The peripheral flow also contributes to the re-atomization and re-entrainment of any liquid which may be disentrained at the walls or accumulate at the bottom of the diffuser mixing chamber, particularly with a high level of liquid in the recycle stream. The annular deflector means 32, which provides both central upward and outer peripheral flow in the mixing chamber, permits a reactor to be operated without the problems of liquid flooding or excessive build up of solids at the bottom of the reactor.

The temperature of the bed is basically dependent on three factors: (1) the rate of catalyst injection which controls the rate of polymerization and the attendant rate of heat generation; (2) the temperature of the gas recycle stream and (3) the volume of the recycle stream passing through the fluidized bed. Of course, the amount of liquid introduced into the bed either with the recycle stream and/or by separate introduction also affects the temperature since this liquid vaporizes in the bed and serves to reduce the temperature. Normally the rate of catalyst injection is used to control the rate of polymer production. The temperature of the bed is controlled at an essentially constant temperature under steady state conditions by constantly removing the heat of reaction. By "steady state" is meant a state of operation where there is no change in the system with time. Thus, the amount of heat generated in the process is balanced by the amount of heat being removed and the total quantity of material entering the system is balanced by the amount of material being removed. As a result, the temperature, pressure, and composition at any given point in the system is not changing with time. No noticeable temperature gradient appears to exist within the upper portion of the bed. A temperature gradient will exist in the bottom of the bed in a layer or region extending above the distributor plate, e.g., for about 6 to about 12 inches, as a result of the difference between the temperature of the inlet fluid and temperature of the remainder of the bed. However, in the upper portion or region above this bottom layer, the temperature of the bed is essentially constant at the maximum desired temperature.

Good gas distribution plays an important role in the efficient operation of the reactor. The fluidized bed contains growing and formed particulate polymer particles, as well as catalyst particles. As the polymer particles are hot and possible active, they must be prevented from settling, for if a quiescent mass is allowed to exist, any active catalyst present will continue to react and can cause fusion of the polymer particles resulting, in an extreme case, in the formation of a solid mass in the reactor which can only be removed with a great difficulty and at the expense of an extended downtime. Since the fluidized bed in a typical commercial size reactor may contain many thousand pounds of solids at any given time, the removal of a solid mass of this size would require a substantial effort. Diffusing recycle fluid through the bed at a rate sufficient to maintain fluidization throughout the bed is, therefore, essential.

Any fluid inert to the catalyst and reactants and which, if a liquid, will volatilize under the conditions present in the fluidized bed, can also be present in the recycle stream. Other materials, such as catalyst activator compounds, if utilized are preferably added to the reaction system downstream from compressor 30. Thus the materials may be fed into the recycle system from dispenser 38 through line 40 as shown in FIG. 1.

The fluid bed reactor may be operated at pressures of up to about 1000 psig. The reactor is preferably operated at a pressure of from about 250 to about 500 psig, with operation at the higher pressures in such ranges favoring heat transfer since an increase in pressure increases the unit volume heat capacity of the gas.

The catalyst which is preferably a transition metal catalyst is injected intermittently or continuously into the bed at a desired rate at a point 42 which is above the distributor plate 28. Preferably, the catalyst is injected at a point in the bed where good mixing with polymer particles occurs. Injecting the catalyst at a point above the distributor plate is an important feature for satisfactory operation of a fluidized bed polymerization reactor. Since catalysts are highly active, injection of the catalyst into the area below the distributor plate may cause polymerization to begin there and eventually cause plugging of the distributor plate. Injection into the fluidized bed aids in distributing the catalyst throughout the bed and tends to preclude the formation of localized spots of high catalyst concentration which may result in the formation of "hot spots". Injection of the catalyst into the reactor is preferably carried out in the lower portion of the fluidized bed to provide uniform distribution and to minimize catalyst carryover into the recycle line where polymerization may begin and plugging of the recycle line and heat exchanger may eventually occur.

The coated inert particulate materials are introduced into the reactor from Vessel 31 through line 31a together with inert gas or alternatively through 31b where it is joined with recycle line 22.

A gas which is inert to the catalyst, such as nitrogen or argon, is preferably used to carry the catalyst into the bed.

The rate of polymer production in the bed depends on the rate of catalyst injection and the concentration of monomer(s) in the recycle stream. The production rate is conveniently controlled by simply adjusting the rate of catalyst injection.

Under a given set of operating conditions, the fluidized bed is maintained at essentially a constant height by withdrawing a portion of the bed as product at the rate of formation of the particular polymer product. Complete instrumentation of both the fluidized bed and the recycle stream cooling system is, of course, useful to detect any temperature change in the bed so as to enable either the operator or a conventional automatic control system to make a suitable adjustment in the temperature of the recycle stream or adjust the rate of catalyst injection.

On discharge of particulate polymer product from the reactor 10, it is desirable, and preferable, to separate fluid from the product and to return the fluid to the recycle line 22. There are numerous ways known to the art to accomplish this. One system is shown in the drawings. Thus, fluid and product leave the reactor 10 at point 44 and enter the product discharge tank 46 through a valve 48 which is designed to have minimum restriction to flow when opened, e.g., a ball valve. Positioned above and below product discharge tank 46 are conventional valves 50, 52 with the latter being adapted to provide passage of product into the product surge tank 54. The product surge tank 54 has venting means illustrated by line 56 and gas entry means illustrated by line 58. Also positioned at the base of product surge tank 54 is a discharge valve 60 which, when in the open position, discharges product for conveying to storage. Valve 50, when in the open position, releases fluid to surge tank 62. Fluid from product discharge tank 46 is directed through a filter 64 and thence through surge tank 62, a compressor 66 and into recycle line 22 through line 68.

In a typical mode of operation, valve 48 is open and valves 50, 52 are in a closed position. Product and fluid enter product discharge tank 46. Valve 48 closes and the product is allowed to settle in product discharge tank 46. Valve 50 is then opened permitting fluid to flow from product discharge tank 46 to surge tank 62 from which it is continually compressed back into recycle line 22. Valve 50 is then closed and valve 52 is opened and product in the product discharge tank 46 flows into the product surge tank 54. Valve 52 is then closed. The product is purged with inert gas preferably nitrogen, which enters the product surge tank 54 through line 58 and is vented through line 56. Product is then discharged from product surge tank 54 through valve 60 and conveyed through line 20 to storage.

The particular timing sequence of the valves is accomplished by the use of conventional programmable controllers which are well known in the art. The valves can be kept substantially free of agglomerated particles by installation of means for directing a stream of gas periodically through the valves and back to the reactor.

The following Examples will illustrate the present invention.

Examples 1 to 10 illustrate the improvements in reducing tack or stickiness of polymer particles in a non-reacting gas fluidized bed when an inert particulate material treated with a selected OM-PDMS was used. Instead of directly evaluating the treated inert particulate material in reacting gas fluidized bed where polymerization reactions take place, the treated material was first evaluated in this non-reacting bed to simulate and determine how much of the polymer stickiness could be reduced when the treated inert particulate material was used. The effects of a treated inert particulate material on fluidized bed reactor operation and the critical content of the material in EPDM polymer produced are comparatively illustrated in Examples 11 and 12.

As shown in the following Examples 1 to 10, the benefits of using a treated inert particulate material over using a neat (or untreated) inert particulate material were determined by measuring and comparing the Maximum Allowable Bed Temperatures (MABTs) and Channelling Bed Temperatures (CBTs) of the gas fluidized bed, both to be defined below. The reason for this is that within the range of the glass transition temperature and melting temperature of a given polymer, the degree of its stickiness increases with the increase of its temperature.

The MABT is defined as the temperature of the gas fluidized bed at which stagnant (or "dead") zones start to form in the bed due to the agglomeration of polymer resin. If the bed temperature is kept below the MABT, the bed maintains the desirable bubbling flow without having any severe agglomeration of polymer resin or formation of dead zones.

When the bed temperature is raised further from the MABT, the polymer resin becomes stickier, resulting in the formation of small stagnant zones caused by resin agglomeration. The stagnant zones grow up with time particularly near the corner of the distributor plate and bed walls. Eventually several small channels (or "rat holes") are formed at the lower portion of the fluidized bed, while the upper portion of the bed is still being fluidized in a bubbling flow regime. A further increase of the bed temperature makes the whole bed collapse within a short period of time. This results in a complete channeling flow with one or multiple channels formed from the bottom to the top of the bed. The gas bypasses through the channels. When the complete defluidization occurs, the pressure drop across the bed decreases sharply. The CBT is defined as the bed temperature at which there form channels in the major portion of the fluidized bed, typically about 50% of the bed by volume. It was possible to visually observe all these phenomena because the fluidized bed was constructed with Plexiglas, a transparent material.

The MABT and CBT of an EPR, measured in a gas fluidized bed, depend among other things upon the stickiness of the EPR in the fluidizing environment, the type of inert particulate materials and their added amounts, the type of OM-PDMS and their added amounts, the superficial velocity of the fluidizing gas, and the type of distributor plates employed in the fluidized bed. For the evaluation of each OM-PDMS fluid, therefore, the fluidization tests were performed by fixing all other independent variables except the type and added amount of each fluid.

Since the degree of stickiness of a given polymer resin increases with the increase of its temperature, the benefits of a surface treatment of an inert particulate material with an OM-PDMS over an untreated inert particulate material are determined by comparing the MABT and CBT obtained with each material. In other words, if a surface treated inert particulate material gives higher MABT and CBT than the neat inert particulate material, the treated one is more efficient in preventing the polymer resin from being agglomerated by reducing the surface stickiness of the polymer particles.

EXAMPLE 1

This example demonstrates measurement of the MABT and CBT of an EPM granular resin when a neat inert particulate material was used. The number average molecular weight of the EPM polymer was 39,000 measured by Size Exclusion Chromatography (SEC). The propylene content in the polymer was 32.1% by weight measured by Nuclear Magnetic Resonance (NMR). The granular resin had a weight average particle size of 0.043 inches (1.092 mm). The neat inert particulate material used for the test was "CD-9002" carbon black produced by Columbian Chemicals Company.

This EPM granular resin (1,960 grams) was mixed with the untreated carbon black powder (40 grams) in a glass jar. The average value of the untreated carbon black concentration in the final mixture was 2% by weight. The glass jar was rolled on a roller at room temperature for approximately 15 hours to provide uniform mixing of the materials and to provide uniform coating of the resin surface with the carbon black. This mixture was introduced into a Plexiglas fluidized bed. The inner diameter and height of the fluidized bed were 6.5 inches (16.51 cm) and 6 feet (1.83 m), respectively. The distributor plate employed for this test was a uniformly porous one which consisted of one perforated stainless steel plate and three layers of fine mesh screens laminated on the obverse of the perforated plate. The diameter of each perforation was 3/64 inches (1.191 mm). The perforations had a triangular matrix with a pitch of 5/32 inches (3.97 mm). The fine mesh screens effectively prevented the fines in the resin from sifting into the bottom head of the fluidized bed. Furthermore, the pressure drop across the distributor plate was high enough (i.e., higher than 25% of the pressure drop across the fluidized bed) to provide a uniform gas flow through the distributor plate. Plant compressed air, after its pressure was properly regulated, was used as the fluidizing gas. An electrical heater with a controller was used to heat up the compressed air which, in turn, controlled the temperature of the fluidized bed or resin. A flow meter and a valve were located at the upstream of the heater, which gave the volume flow rate of air at room temperature. To maintain the superficial gas velocity in the fluidized bed at 2.3 ft/s (0.701 m/s) at all bed temperatures, it was necessary to adjust the valve and flow meter reading at each temperature level to compensate for the expansion of gas with an increase of temperature. The pressure and temperature of the fluidized bed were measured by using a manometer and a thermocouple, respectively. The pressure in the fluidized bed was slightly higher than the atmospheric pressure.

The test started at room temperature. The settled bed height was 8.5 inches. When the superficial gas velocity was set at 2.3 ft/s, a very small amount, if any, of the carbon black was entrained during the first 2 to 3 seconds and there was no entrainment thereafter. The material was fluidizing very well in a bubbling flow regime at that gas velocity with an average value of the fluidized bed height of about 14.5 inches. The fluidized bed was carefully observed to ensure that there were no dead zones at the gas velocity. The set point of the heater controller was increased to raise the temperature of the fluidized bed. The typical increment of the set point was about 3° C. to 5° C. It took about 15 minutes for the fluidized bed to reach a steady state at the higher level of temperature. Once the bed reached a steady state at the higher temperature, the air flow rate was adjusted to maintain the same superficial gas velocity and the bed was operated for at least 30 minutes. During this period of time, the bed was carefully observed to determine whether there occurred any severe agglomeration of resin or formation of dead zones.

When the fluidized bed reached a steady state at a temperature of 45° C. and the same superficial gas velocity, there first formed a small dead zone at one corner of the distributor plate and the bed wall. As time passed, the size of the first dead zone increased and another small dead zone was formed on the other side of the corner. Visual observation through the Plexiglas wall suggested that each dead zone had a shape similar to a triangle. Both dead zones grew up to about 0.5 inches in both base and height for the first 15 minutes and stayed there for the next 15 minutes. Therefore, the MABT of this fluidized bed was 45° C.

When the temperature was raised above the MABT by about 3° C., the size of each dead zone was increased in both base and height, and other dead zones were also formed and grew up at different locations of the corner. Eventually, all the resin in the whole corner became stagnant with multiple channels. When the bed reached a steady rate, the height of the dead zone was observed to vary from 0.5 inches to 1.0 inch depending upon the locations. A further increase of the bed temperature by 3° C. rapidly increased the height of the dead zone. When the bed temperature reached a steady state, the stagnant portion of the bed was channelling severely and its volume reached up to about 50% of the total bed volume. Most of the air bypassed through the channels and the resin above the stagnant layer was still fluidizing in a bubbling flow regime. Therefore, the CBT of this fluidized bed was 51° C.

The following Examples 2 to 4 illustrate not only the benefits of a surface treatment of the inert particulate material with an OM-PDMS but also the effect of its concentration on MABT and CBT. The same fluidization test facilities, test method, test conditions, EPM granular resin, and inert particulate material as in Example 1 were used for the tests shown in these examples. The inert particulate material, however, was now treated with a selected OM-PDMS before the material was mixed with the EPM granular resin to provide a test sample. Since the volume of the OM-PDMS is substantially smaller than the volume of the carbon black to be treated, the OM-PDMS was dissolved in a solvent, the volume of which was big enough to make a carbon black slurry with. Methylene chloride was used as the solvent. The solvent was then evaporated at room temperature, leaving the carbon black uniformally treated with the OM-PDMS. Normally, the treated carbon black was caked up, requiring a subsequent pulverization to make a powder to facilitate the dispersion of the carbon black on the surface of EPM resin. Either a mortar and pestle or a blender can be used for the pulverization of such small amount of caked carbon black. A blender manufactured by Waring was used to pulverize the treated carbon blacks used in these examples.

EXAMPLE 2

The OM-PDMS used to treat the same carbon black as in Example 1 was a 3-hydroxypropyl PDMS and in the formula indicated previously, $X=15$, $Y=0$ and $Z=5$. R, R" are methyl, R''' is $(CH_2)_3OH$ and is referred to as OM-PDMS-A hereinafter.

Forty grams of the carbon black was treated with 2 grams of OM-PDMS-A. The total weight of the final sample prepared for the test was 2,000 grams: 1,958 grams EPM, 40 grams carbon black (2% by weight), and 2 grams OM-PDMS-A (0.1% by weight).

The MABT and CBT obtained with this sample were 52° C. and 63° C., respectively. The benefit of this treatment was a 7° C. increase in MABT and a 12° C. increase in CBT over the same amount of neat carbon black shown in Example 1. These results clearly show that the treatment made the carbon black more efficient in preventing the polymer resin from being agglomerated by reducing the surface stickiness of the polymer particles. In other words, the OM-PDMS-A provided the carbon black with a synergistic effect (or synergism).

EXAMPLE 3

Forty grams of CD-9002 carbon black was treated with 4 grams of OM-PDMS-A. The total weight of the final sample prepared for the test was 2,000 gram: 1,956 gram EPM, 40 gram carbon black (2% by weight), and 4 gram OM-PDMS-A (0.2% by weight).

The MABT and CBT obtained with this sample were 63° C. and 69° C., respectively. When the concentration of the OM-PDMS-A in the carbon black was increased, a higher synergistic effect was obtained.

EXAMPLE 4

Since the synergistic effect increased with the increase of the OM-PDMS-A concentration in the carbon black, the test sample was made so that it consisted of 1,950 grams EPM, 40 grams CD-9002 (2% by weight), and 10 grams OM-PDMS-A (0.5% by weight).

The MABT and CBT obtained with this sample were 63° C. and 77° C., respectively. When these results were compared with those in Example 3, it was seen that a further increase of OM-PDMS-A concentration in the carbon black did not give any substantially higher synergistic effect. In fact, the MABTs were the same. It appeared that there exists an optimum concentration of this OM-PDMS-A in this carbon black.

EXAMPLE 5

This example illustrates that not all OM-PDMSs give the synergistic effect. The OM-PDMS used in this example is "SILWETT L-77", a commercial product of Union Carbide Chemicals and Plastics Company Inc., which is not included in the OM-PDMS structural formula. The same fluidization test facilities, test method, test conditions, EPM granular resin, inert particulate material, and treatment method as in Example 2 were used for the test. The test sample consisted of 1,956 grams EPM, 40 grams CD-9002 carbon black (2% by weight), and 4 grams "SILWETT L-77" (0.2% by weight).

The MABT and CBT obtained with this sample were 45° C. and 51° C., respectively. When these results were compared with those in Examples 1 and 3, it was seen that "SILWETT L-77" did not provide the synergism.

The following Examples 6 to 10 illustrate that similar benefits were obtained regardless of the types of EPM polymer and inert particulate material. The EPM resin used for these examples had a number average molecular weight of 31,000 measured by SEC, a weight average particle size of 0.039 inches (0.991 mm), and a propylene content in the polymer of 27.3% by weight measured by NMR. The inert particulate material used for these examples was "Polyfil-90" which was a calcined clay commercially produced by J. M. Huber Corporation. The OM-PDMS-A was used to treat the inert Particulate material for these examples.

EXAMPLE 6

To prepare a test sample, an EPM granular resin of 1,900 grams and an untreated "Polyfil-90" calcined clay of 100 grams were mixed using the same procedures as in Example 1. The average concentration of the clay in the mixture was 5% by weight.

The same non-reacting fluidization test facilities as in Example 1 were utilized. The same test procedures as in Example 1 were employed, including a superficial gas velocity of 2.3 ft/s (0.701 m/s).

The MABT and CBT obtained with this sample were 64° C. and 67° C., respectively.

EXAMPLE 7

Employing the same treatment method as in Examples 2 to 5, 100 grams of "Polyfil-90" were treated with 2 grams of the OM-PDMS-A. The test sample consisted of 1,898 grams EPM, 100 grams "Polyfil-90" (5% by weight), and 2 grams OM-PDMS-A (0.1% by weight).

The measured MABT and CBT of this sample were 75° C. and 79° C., respectively. When these values were compared with those in Example 6, it was apparent that the treatment gave a substantial synergistic effect: 11° C. increase of MABT and 12° C. increase of CBT.

EXAMPLE 8

One hundred grams of "Polyfil-90" was treated with 4 grams of the OM-PDMS-A using the same treatment method as in Example 7. The test sample consisted of 1,896 grams EPM, 100 grams "Polyfil-90" (5% by weight), and 4 grams OM-PDMS-A (0.2% by weight).

The test results showed that the MABT and CBT of this sample were 79° C. and 84° C., respectively. When the concentration of the OM-PDMS-A in the calcined clay was increased, a higher synergistic effect was obtained: 15° C. and 17° C. increases of MABT and CBT, respectively.

EXAMPLE 9

Since the synergism was enhanced with the increase of the OM-PDMS-A concentration in the calcined clay, the test sample was made in a way that it consisted of 1,892 grams EPM, 100 grams "Polyfil-90" (5% by weight), and 8 grams of OM-PDMS-A (0.4% by weight).

The measured MABT and CBT of this sample were 83° C. and 88° C., respectively. Comparing these values with those in Example 8, it was apparent that the synergistic effect was still increasing with the increase of the OM-PDMS-A concentration in the calcined clay: another 4° C. increase of both MABT and CBT.

EXAMPLE 10

To determine whether the synergism would be raised further when the concentration of the OM-PDMS-A was increased even further, the test sample was provided in a way that it consisted of 1,888 grams EPM, 100 grams "Polyfil-90" (5% by weight), and 12 grams OM-PDMS-A (0.6% by weight).

The test results showed that the MABT and CBT of this sample were 83° C. and 87° C., respectively. No further enhanced synergistic effect was obtained when this large amount of the OM-PDMS-A was used to treat the calcined clay. It appeared that there exists an optimum concentration of this OM-PDMS-A in this clay.

The following Examples 11 and 12 illustrate the benefits that are obtained when an inert particulate material treated with an OM-PDMS is used in a gas-phase fluidized bed reactor to produce an EPDM granular resin. N-650 carbon black powder is used as an inert particulate material and OM-PDMS-A is used as an OM-PDMS. This N-650 rubber grade carbon black is the one commercially produced by Columbian Chemicals Company. The amounts of propylene and ENB incorporated in the polymers are measured by Nuclear Magnetic Resonance (NMR) technique. The amounts of the carbon black incorporated on the polymer particles are determined by Thermogravimetric Analysis (TGA).

EXAMPLE 11

Production of EPDM with Untreated N-650 Carbon Black

The fluidized bed pilot plant reactor has an inner diameter of about 14 inches (35.56 cm). The superficial gas velocity in the fluidized bed reactor is typically maintained at about 2.5 ft/s (0.762 m/s); the fluidized bed height at about 5.5 feet (1.68 m); and the reactor temperature at 70° C.

Before the N-650 carbon black powder is introduced into the fluidized bed reactor through the bottom mixing chamber below the distributor plate, the carbon black is heated and purged simultaneously in a purge vessel to remove absorbed water and oxygen which are poison for the catalyst. Typically, the carbon black is heated at about 150° C. by steam coils installed at the outer surface of the vessel and insulated. At the same time, the carbon black is slowly purged with nitrogen for at least 4 hours. Since a large inventory of the purged carbon black is needed to continuously operate the reactor for a long period of time, purging is done in a batch mode in a large vessel. This vessel has a total volume of about 30 ft$^3$ (2 feet in diameter and about 10 feet in height) and typically handles about 250 pounds of the carbon black per each batch operation. Two identical vessels are typically employed in tandem: i.e., while one vessel is being emptied out to feed the purged carbon black into the reactor, the other one is being heated and purged.

A vanadium based catalyst is employed with triisobutylaluminum (TIBA) and chloroform (CHCl$_3$) as the cocatalyst and promoter, respectively. Since only a small amount of such cocatalyst and promoter is needed for the polymerization reaction, a 10% (by weight) solution with isopentane is made and fed into the reactor to facilitate the control of the feed rate. The feed rate ranges of TIBA and CHCl$_3$ solutions are 600 to 700 cc/hr and 300 to 400 cc/hr, respectively.

The reactor total pressure is maintained at about 300 psi, while the partial pressure of ethylene is maintained at about 100 psi. When the reactor operation reaches a steady state, the values of $C_3/C_2$ and $H_2/C_2$, all molar ratios, are maintained at 1.3 to 1.7 and 0.002 to 0.004, respectively. Hydrogen is used to control the melt index of the product, more specifically to control its Mooney viscosity. ENB (5-ethylidene-2-norbornene) is used as diene. At steady state of the reactor operation, the typical feed rate of ENB is 200 to 240 cc/hr. The rest of the gas composition is nitrogen.

The reactor is operated by feeding the carbon black at a rate of about 900 to 1,100 g/hr. Carbon black incorporated EPDM granular resin is produced at the rate of 6 to 9 lb/hr without encountering any serious reactor operational problems. Typical samples have the following properties:

| | |
|---|---|
| Propylene content = | 44.2% by weight |
| ENB incorporation = | 5.2% by weight |
| Mooney viscosity = | 30 |
| Carbon black content = | 35% by weight |
| Average particle size of the resin = | 0.052 inches (1.321 mm). |

To determine the critical carbon black content in the product at about the same production rate, the feed rate of the carbon black is gradually reduced. This critical carbon black content is the value above which the fluidized bed reactor produces granular resin without having any excessive agglomeration of resin and reactor operational problems, but below which small agglomerates start to form in the reactor and being discharged with granular resin through the product discharge valve and product discharge tank. If the reactor were operated below the critical carbon black content for a certain period of time, fluidizaton would cease resulting in a channelling flow and subsequently requiring a reactor shut-down. When the carbon black feed rate is reduced to about 750 g/hr, small agglomerates start to form in the reactor which are discharged with granular resin through the product discharge valve and product discharge tank. A typical sample is analyzed to referencing the following properties:

| | |
|---|---|
| Propylene content = | 47% by weight |
| ENB incorporation = | 5.6% by weight |
| Mooney viscosity = | 35 |
| Carbon black content = | 30% by weight |
| Average particle size of the resin = | 0.072 inches (1.829 mm). |

EXAMPLE 12

Production of EPDM with N-650 Carbon Black Treated with OM-PDMS-A

The same N-650 carbon black as in Example 11 is treated with the OM-PDMS-A. Since the treatment method shown in Example 2 is not practical to treat a large amount of carbon black, the following treatment method is preferred and used.

Typical carbon black producers use liquid binders to make carbon black beads out of carbon black powder in a wet-beading process. This beading process is to increase the bulk density of the carbon black for ease of handling and shipping. A typical liquid binder is a water solution of a binding agent selected from either corn syrup, lignin sulfonates, or molasses. The wet beads are then dried in a rotary kiln at a typical temperature of about 500° F., where the water evaporates and the binding agent is carbonized.

The treatment of the carbon black with the OM-PDMS-A is done by using these wet-beading and drying processes. This time, an emulsion of the OM-PDMS-A is used as the liquid binder to make beads. The emulsion contains about 35% by weight of the OM-PDMS-A. The carbon black beads are dried in the rotary kiln, and subsequently pulverized using a hammer mill to make the powder treated with the OM-PDMS-A. In the wet-beading process, the amount of OM-PDMS-A emulsion is controlled in a way that the treated carbon black contains about 10% of OM-PDMS-A by weight. Before this treated carbon black powder is introduced into the fluidized bed reactor, this material is heated and purged in the same vessel with the same procedures as in Example 11.

Utilizing the same reactor and with the same catalyst, cocatalyst, promoter, diene, $C_3/C_2$ and $H_2/C_2$ molar ratios, superficial gas velocity, and reactor temperature described in Example 11, an attempt is made to produce the same EPDM granular resin as in Example 11. The treated carbon black powder is fed at a rate of about 800 to 1,000 g/hr. The feed rates of cocatalyst and promoter solutions are about 600 to 700 cc/hr and 300 to 400 cc/hr, respectively. ENB is fed at a rate of 200 to 240 cc/hr. The reactor runs well producing a carbon black incorporated EPDM granular resin at a rate of 7 to 10 lb/hr. Typical samples have the following properties:

| | |
|---|---|
| Propylene content = | 44.0% by weight |
| ENB incorporation = | 5.1% by weight |
| Mooney viscosity = | 32 |
| Carbon black content = | 27% by weight |
| Average particle size of the resin = | 0.045 inches (1.143 mm). |

Following the same procedure described in Example 11, the critical carbon black content in the product is determined. A typical sample of initial agglomerates is analyzed to reveal the following properties:

| | |
|---|---|
| Propylene content = | 45.8% by weight |
| ENB incorporation = | 5.4% by weight |
| Mooney viscosity = | 34 |
| Carbon black content = | 23% by weight |
| Average particle size of the resin = | 0.070 inches (1.778 mm). |

When this critical carbon black content in this example is compared with that in Example 11, a smaller amount of the treated carbon black (by about 23% by weight) is needed to produce about the same EPDM products at about the same reactor operating conditions. Therefore, the synergistic effect of the OM-PDMS-A on an inert particulate material is also clearly seen in a fluidized bed reactor.

What is claimed is:

1. A process for preventing agglomeration of sticky polymers in a polymerization system which comprises adding to said polymerization system about 0.3 to about 80 weight percent based on the weight of the final product of an inert particulate material having a surface coating thereon of an organo modified polydimethylsiloxane (OM-PDMS) of the formula:

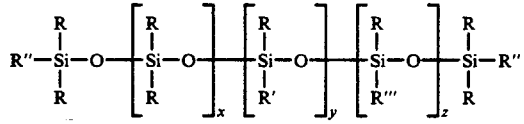

wherein:

R, may be the same or different, and represents phenyl or an alkyl group having from 1 to 4 carbon atoms;

R', represents hydrogen, or a straight or branched or cyclic alkyl chain having 5 to 50 carbon atoms;

R", may be the same or different and represents R or R'

R''' is alkylene, cycloalkyl, or alkoxy which can be substituted with hydroxy, amino, alkyl substituted amino, hydroxyl amino, phenol, alkyl substituted phenol, alkyl substituted piperidinoxy and epoxy;

X = is an integer of 0 to <2000

Y = is an integer of 0 to <2000,

Z is an integer of 1 to 2000, with the proviso that the sum of (x+y+z) is greater than or equal to 4 and less than or equal to 2000, with the further proviso that the repeat units if they are present can be in any sequence, either random or non-random.

2. A process for preventing agglomeration of sticky polymers in a fluidized bed which comprises adding to said fluidized bed about 0.3 to about 80 weight percent based on the weight of the final product of an inert particulate material having a surface coating thereon of a OM-PDMS of the formula.

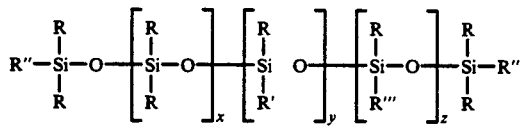

wherein
R, may be the same or different, and represents phenyl or an alkyl group having from 1 to 4 carbon atoms;
R', represents hydrogen, or a straight or branched or cyclic alkyl chain having 5 to 50 carbon atoms;
R'', may be the same or different and represents R or R'
R''' is alkylene, cycloalkyl, or alkoxy which can be substituted with hydroxy, amino, alkyl substituted amino, hydroxyl amino, phenol, alkyl substituted phenol, alkyl substituted piperidinoxy and epoxy;
X = is an integer of 0 to <2000
Y = is an integer of 0 to <2000,
Z is an integer of 1 to 2000, with the proviso that the sum of (x+y+z) is greater than or equal to 4 and less than or equal to 2000, with the further proviso that the repeat units if they are present can be in any sequence, either random or non-random.

3. A process according to claim 1 wherein said polymerization system includes a stirred reactor.

4. A process according to claim 1 wherein said coating is present on said inert particulate material in an amount of about 0.02% to about 20% based on the weight of said inert particulate material.

5. A process according to claim 1 wherein said coating is present on said inert particulate material in an amount of about 1% to about 10% based on the weight of said inert particulate material.

6. A process according to claim 1 wherein said inert particulate material having said organo-modified polydimethylsiloxane coating thereon is selected from the group consisting of carbon black, silica, talc, and clay.

7. A process according to claim 1 wherein said inert particulate material is carbon black having a primary particle size of about 1 to about 100 nanometers, an average size of aggregate of about 0.01 to about 10 microns, a specific surface area of about 30 to about 1,500 m²/gm and a dibutylphthalate absorption of about 10 to about 700 cc/100 grams.

8. A process according to claim 1 wherein said inert particulate material is amorphous silica having a primary particle size of about 5 to 50 nanometers, an average size of aggregate of about 0.1 to about 10 microns, a specific surface area of about 50 to about 500 m²/gm and a dibutylphthalate absorption of about 100 to 400 cc/100 grams.

9. A process according to claim 1 wherein said inert particulate material is non-aggregated silica, or talc, or clay, having an average particle size of about 0.01 to about 10 microns, a specific surface area of about 2 to 350 m²/gm and an oil absorption of about 20 to about 300 gm per 100 gm.

10. A process according to claim 1 wherein said sticky polymers are:
 a. ethylene propylene rubbers;
 b. ethylene propylene diene termonomer rubbers;
 c. polybutadiene rubbers; and
 d. high ethylene content propylene ethylene block copolymers;
 e. essentially amorphous or elastomeric polypropylenes;
 f. ethylene/butene, ethylene hexane, ethylene/propylene butylene, ethylene/propylene/hexane and ethylene/butene/hexene polymers.

11. A process according to claim 10 wherein said ethylene/propylene/diene termonomers are ethylene/propylene/ethylidenenorbornene termonomers.

12. A process according to claim 10 wherein said ethylene propylene diene termonomers are ethylene/propylene/hexadiene termonomers.

13. A process according to claim 7 wherein said carbon black is employed in an amount of about 0.3% to about 70% based on the weight of the final polymer product.

14. A process according to claim 7 wherein said carbon black is employed in an amount of about 5% to 65% based on the weight of the final product.

15. A process according to claim 8 wherein said amorphous silica is employed in an amount of about 0.3% to about 70% based on the weight of the final product.

16. A process according to claim 8 wherein said amorphous silica is employed in an amount of about 5% to about 65% based on the weight of the final product.

17. A process according to claim 9 wherein said non-aggregated silica, talc, or clay is employed in an amount of about 0.3% to about 80% based on the weight of the final product.

18. A process according to claim 9 wherein said non-aggregated silica, talc, or clay is employed in an amount of about 12% to about 75% based on the weight of the final product.

19. A process according to claim 1 wherein R is methyl, R' is hydrogen and R'' is methyl.

20. A process for preventing agglomeration of ethylene propylene ethylidenenorbornene terpolymers produced in a fluidized bed reactor catalyzed by a transition metal catalyst, which comprises conducting said polymerization reaction in the presence of about 0.3 to about 70 weight percent, based on the weight of the final product of carbon black having a primary particle size of about 1 to about 100 nanometers, an average size of aggregate of about 0.01 to about 10 microns, a specific surface area of about 30 to about 1,500 m²/gm, and a dibutylphthalate absorption of about 10 to about 700 cc/100 grams, said carbon black having a surface coating thereon of an organo modified polydimethylsiloxane of the formula:

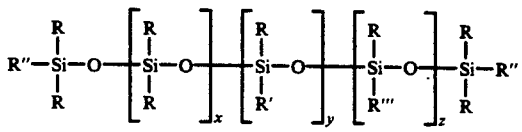

wherein:
R, may be the same or different, and represents phenyl or an alkyl group having from 1 to 4 carbon atoms;

R', represents hydrogen, or a straight or branched or cyclic alkyl chain having 5 to 50 carbon atoms;

R", may be the same or different and represents R or R'

R''' is alkylene, cycloalkyl or alkoxy which can be substituted with hydroxy, amino, alkyl substituted amino, hydroxyl amino, phenol, alkyl substituted phenol, alkyl substituted piperidinoxy and epoxy;

X = is an integer of 0 to <2000

Y = is an integer of 0 to <2000,

Z is an integer of 1 to 2000, with the proviso that the sum of (x+y+z) is greater than or equal to 4 and less than or equal to 2000, with the further proviso that the repeat units if they are present can be in any sequence, either random or non-random.

21. A process according to claim 20 wherein said carbon black is employed in an amount of about 5% to about 65% based on the weight of the final product.

22. A process according to claim 20 wherein said carbon black is heated and purged with nitrogen prior to entry in said reactor.

23. A process according to claim 20 wherein said surface coating is present in said carbon black in an amount of about 0.02% to about 20% based on the weight of said carbon black.

* * * * *